United States Patent
Rai et al.

(10) Patent No.: US 12,511,187 B1
(45) Date of Patent: Dec. 30, 2025

(54) MONITORING EMERGING FAULTS

(71) Applicant: Citibank, N.A., New York, NY (US)

(72) Inventors: Akhilesh Rai, Maharashtra (IN); Dilip Srinivas Krovi, Irving, TX (US); Sarthak Saptarshi Bandopadhyay, Irving, TX (US); Ravinder Singh Choudhary, Irving, TX (US); Richard Lawton, Irving, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/067,141

(22) Filed: Feb. 28, 2025

(51) Int. Cl.
G06F 11/00 (2006.01)
G06F 11/07 (2006.01)

(52) U.S. Cl.
CPC ........ G06F 11/079 (2013.01); G06F 11/0709 (2013.01)

(58) Field of Classification Search
CPC .... G06F 11/079; G06F 11/07; G06F 11/0709; G06N 20/00; G06N 20/20
See application file for complete search history.

(56) References Cited

U.S. PATENT DOCUMENTS

| | | | | |
|---|---|---|---|---|
| 5,487,148 A * | 1/1996 | Komori | ................. | G06F 11/327 714/E11.187 |
| 6,715,103 B1 * | 3/2004 | Nagai | ..................... | H04L 43/50 709/227 |
| 12,007,832 B2 * | 6/2024 | Anand | ................ | G06F 11/0793 |
| 12,265,446 B1 * | 4/2025 | Callot | .................... | G06N 20/20 |
| 2013/0063262 A1 * | 3/2013 | Shaikh | ............... | G05B 23/0272 340/540 |
| 2016/0170818 A1 * | 6/2016 | Zhu | ....................... | G06F 11/079 702/185 |
| 2016/0342903 A1 * | 11/2016 | Shumpert | ............ | G06F 11/008 |
| 2018/0032386 A1 * | 2/2018 | DeChiaro | ........... | G06F 11/0709 |
| 2019/0372827 A1 * | 12/2019 | Vasseur | ................... | H04L 41/22 |
| 2020/0250477 A1 * | 8/2020 | Barthur | ............... | G06F 11/0751 |
| 2021/0232995 A1 * | 7/2021 | Zhang | .............. | G06Q 10/06375 |
| 2021/0303381 A1 * | 9/2021 | Baldassarre | ............ | G06N 5/04 |
| 2022/0086060 A1 * | 3/2022 | Tamir | .................. | H04L 41/5009 |
| 2023/0023646 A1 * | 1/2023 | Xu | ......................... | G06F 11/004 |
| 2024/0036963 A1 * | 2/2024 | Azeez | ..................... | G06N 20/00 |
| 2024/0143435 A1 * | 5/2024 | Poosapalli | .......... | G06F 11/0721 |
| 2024/0210931 A1 * | 6/2024 | Derhake | ............. | H04L 41/0686 |

* cited by examiner

Primary Examiner — Jonathan D Gibson
(74) Attorney, Agent, or Firm — Perkins Coie LLP

(57) ABSTRACT

Systems and methods for monitoring emerging faults at a network system are disclosed herein. The system may receive, such as from tool-based monitoring systems, data including measurements and testing results. The system may input an operational metric dataset into a fault detection machine learning model to obtain an indication of and degree of the fault condition at the network system. Responsive to determining that the degree of the fault condition indicates uncertainty of whether fault has occurred, the system may identify second commands. Based on transmitting the second commands, additional parameters may be obtained for generating an augmented dataset. The system may input the augmented dataset into the fault detection machine learning model to obtain an updated indication of the fault condition and updated degree of the fault condition and transmit an alert to an operator device.

20 Claims, 10 Drawing Sheets

```
Command_Set_1 {
    test_ping_at_node2(target = "8.8.8.8");
    test_port1(host= "sample.org", port = 443);
}
Command_Set_2 {
    check_logs_at_node3();
}
```

```
64 bytes from 8.8.8.8:   icmp_seq=0    ttl=57    time=41.180ms
64 bytes from 8.8.8.8:   icmp_seq=1    ttl=57    time=47.264ms
64 bytes from 8.8.8.8:   icmp_seq=2    ttl=57    time=41.461ms
64 bytes from 8.8.8.8:   icmp_seq=3    ttl=57    time=47.398ms
64 bytes from 8.8.8.8:   icmp_seq=4    ttl=57    time=41.070ms -----sample.org ping statistics ---
5 packets transmitted, 5 packets received, 0.0% packet loss
round-trip min/avg/max/stddev = 41.070/43.675/47.398/2.888ms
```

*FIG. 3B*

MONITORING EMERGING FAULTS

BACKGROUND

Computing systems have become vital to our lives. From medical devices to cloud systems that host our schedules, we use computing systems countless times every day. However, when some of these systems break down, the results may vary from minor inconvenience to a life-or-death situation. Accordingly, it is vital to monitor these computing systems and detect what faults or problems occur. To solve this problem, various types of monitoring systems are available today. Monitoring systems can detect when things break and report those issues to an operator that can then act upon the alert. However, when systems break, it may be too late. Thus, it is even more vital to be able to predict problems before they occur. To do that, a large amount of data is required and processing that data may be challenging.

SUMMARY

In some cases, to solve the problems above, enterprises use a variety of monitoring tools to detect faults. However, those monitoring tools may not interoperate well together. Accordingly, methods and systems are disclosed herein for using multiple tools together to monitor and predict faults. Furthermore, machine learning has become ever present in various applications that directly impact our daily lives. When used for fault detection, conventional machine learning models may return an uncertain result. For example, a system may attempt to predict how likely a fault is to occur based on a predetermined, static threshold. Setting the threshold too low can mean that systems are typically overly sensitive to normal network variability. Frequent false positives may overwhelm network engineers and, over time, may desensitize operators to real issues. However, setting the threshold too high may mean missing faults that may escalate and potentially cause a system-wide shutdown.

In order to compensate and increase accuracy, systems may rely on large numbers of parameters, making it both resource expensive and time consuming to identify faults. Furthermore, some utilize multiple machine learning models trained on specific faults. Accordingly, a mechanism is desired that enables detection of faults with minimal resource consumption. One mechanism for doing so may include dynamically changing the number of inputs based on the uncertainty of a fault condition. For example, where a process is certain that a fault would occur or is certain a fault would not occur using a smaller initial set of real-time readings, the process may stop execution, and no further resources may be needed to be expended. However, where the process indicates uncertainty (e.g., unsure whether detected behavior is a fault or not), the system may obtain additional data (e.g., in real time) to input into a machine learning model to determine whether a fault is likely.

In particular, the system may generate commands for tool-based monitoring systems that execute operations (e.g., monitoring and testing) to obtain operational metrics. Based on transmitting the commands, the system may receive monitoring data and testing data from a specific timeframe, such as a current timeframe (e.g., in real time). As described herein, the monitoring and testing data may be a small subset of the data available, so as to reduce the parameters of the data the model executes on.

Using the monitoring data and the testing data, the system may synthesize an operational metric dataset for input into a fault detection machine learning model. The model may output an indication of a fault condition (e.g., high latency) and a degree of the fault condition at the network system (e.g., a percentage). If the indication indicates uncertainty, that is, statistically indeterminate (e.g., between 40%-60%), the system can obtain more data to ascertain whether a fault is occurring. For example, the system may identify commands (e.g., ping commands, traceroute commands) associated with the specific fault condition (e.g., high latency) and use those commands to obtain additional parameters (e.g., rtt). The additional parameters can then be input into the same fault detection machine learning model to obtain an updated indication of the fault condition and updated degree of the fault condition.

Because fault detection is sparse, operating primarily on a smaller set of readings saves considerably on time and resources. Only when necessary can the system obtain more data to ascertain more accurately whether a fault is likely to occur or not. Furthermore, because only one model is used, rather than multiple, the model is less likely to overfit and it is less computationally expensive to update the one model.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates a data structure that represents a plurality of commands, such as for executing a monitoring operation and a testing operation at tool-based monitoring systems, in accordance with one or more embodiments of this disclosure.

FIG. 3B illustrates an exemplary representation of testing data including testing results, in accordance with one or more embodiments of this disclosure.

DETAILED DESCRIPTION

Figure 1:
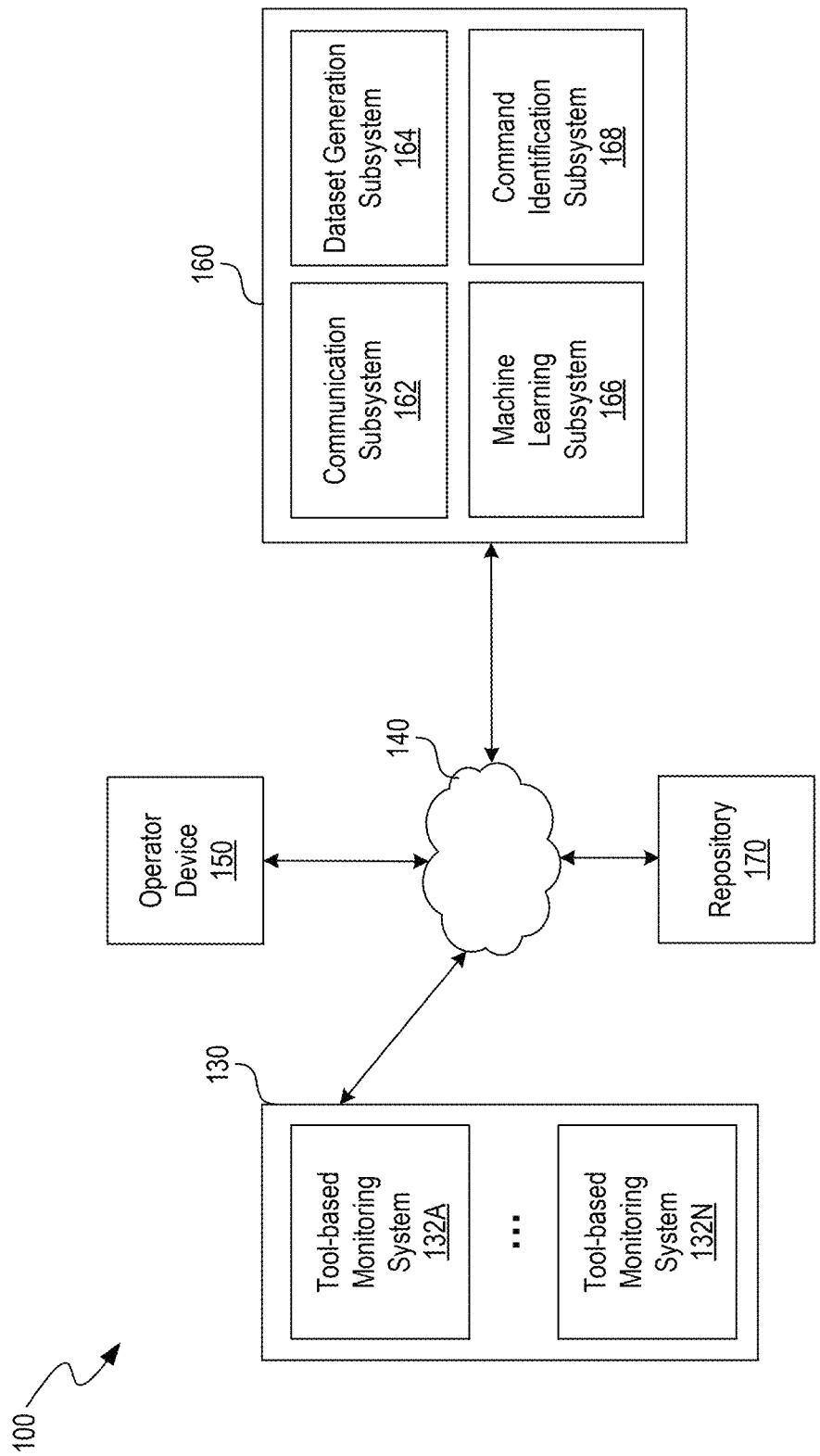
FIG. 1 shows an illustrative system for monitoring emerging faults at a network system, in accordance with one or more embodiments of this disclosure.

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Attempting to create a system and process to monitor emerging faults in a network system in view of the available conventional approaches created significant technological uncertainty. Creating such platform/system/process required addressing several unknowns in conventional approaches of using specialized machine learning models or relying on reviewing or processing large numbers of parameters, which may be costly and resource intensive for many small entities.

For example, conventional approaches often rely on determining whether an output of a model, such as a probability of a fault occurring, exceeds a predetermined, static threshold. As described herein, such static thresholds are often problematic. For example, setting the threshold too low can cause over-sensitivity to normal network variability. However, setting the threshold too high can mean important edge cases are overlooked. Conventional approaches typically involve obtaining more data than is typically necessary by obtaining and processing large amounts of parameters which can be resource intensive. These systems do not enable flexibility in the amounts of data obtained and processed based on the uncertainty of the likelihood of a fault. Conversely, the disclosed system dynamically obtains different data based on a level of uncertainty and a type of fault that the system detects.

Additionally, enabling dynamic retrieval of necessary data created further technological uncertainty. Since legacy systems only use static thresholds, they did not enable dynamic determination of the types of data or the location from which data should be obtained. Thus, to overcome the technological uncertainties, the inventors systematically evaluated multiple design alternatives. For example, the inventors determined the best junctures at which to obtain additional data and how to quickly obtain relevant data.

Thus, the inventors experimented with different methods for conserving resources and computation usage, e.g., to conserve energy. For example, the inventors experimented with different methods to identify the most efficient and effective approaches. Additionally, the inventors systematically evaluated different strategies for using a single model for both iterations of fault detection. The inventors evaluated, for example, different methods of monitoring and processing data, such as using multiple models. However, using just one model was less resource intensive.

Environment 100 of FIG. 1 shows an illustrative system for monitoring emerging faults at a network system, in accordance with one or more embodiments of this disclosure. For example, environment 100 may be used to monitor emerging faults such as device failures (e.g., router or switch hardware malfunctioning), configuration errors, link failures, software failures (operating system issues, firmware glitches in networking equipment, etc.), firmware issues, etc. While conventional systems rely on large numbers of parameters in determining whether there is a fault, doing so is resource expensive and time consuming to identify faults. Instead, according to some examples, the techniques herein utilize a first set of measurements and data to detect faults using a machine learning model. In cases where the output of the machine learning model shows uncertainty based on the first set of data, the system can obtain more data with which to augment the data and use the augmented data to ascertain whether the fault exists.

For example, environment 100 may include an emerging fault detection system 160 able to detect emerging faults. Emerging fault detection system 160 may include software, hardware, or a combination of the two. For example, emerging fault detection system 160 may be a physical server or a virtual server that is running on a physical computer system. In some embodiments, emerging fault detection system 160 may be configured on a user device (e.g., a laptop computer, a smartphone, a desktop computer, an electronic tablet, or another suitable user device) and configured to execute instructions for monitoring emerging faults. In particular, emerging fault detection system 160 may include several subsystems, each configured to perform one or more steps of the methods described herein, such as communication subsystem 162, dataset generation subsystem 164, machine learning subsystem 166, and command identification subsystem 168.

As described herein, the emerging fault detection system 160 may obtain data with which the system may determine whether or not a fault is emergent. The emerging fault detection system 160 may receive the data from tool-based monitoring systems, such as from a set of tool-based monitoring systems 130 (e.g., including tool-based monitoring system 132A, tool-based monitoring system 132N). As described herein, a tool-based monitoring system may be any system (e.g., computer, device, node, etc.) that is enabled to execute one or more tools for monitoring the functioning at the system or externally or enabled to execute tasks for which data may be passively collected.

The emerging fault detection system 160 may be configured to receive the data via communication network 140 at communication subsystem 162 of the emerging fault detection system. Communication network 140 may be a local area network (LAN), a wide area network (WAN; e.g., the internet), or a combination of the two. Communication subsystem 162 may include software components, hardware components, or a combination of both. For example, communication subsystem 162 may include a network card (e.g., a wireless network card and/or a wired network card) that is associated with software to drive the card. Communication subsystem 162 may pass at least a portion of the data, or a pointer to the data in memory, to other subsystems such as dataset generation subsystem 164, machine learning subsystem 166, and command identification subsystem 168.

According to some embodiments, the emerging fault detection system 160 may be able to obtain such data by generating one or more commands for the tool-based monitoring systems configured to cause execution of monitoring operations and/or testing operations at a tool-based monitoring system to obtain operational metrics. In some examples, the command(s) may specify a specific timeframe for obtaining the data (e.g., by identifying explicitly the timeframe via a start and end time, or implicitly by requesting data from a current block of time).

For example, FIG. 2 illustrates a plurality of commands 200, such as for executing a monitoring operation and a testing operation at tool-based monitoring systems, in accordance with one or more embodiments of this disclosure. In the example of FIG. 2, the commands for transmittal to a different node or device on the network are stored as separate data structures "Command_Set_1" and "Command_Set_2." "Command_Set_1" including testing commands such as testing functions "test_ping_at_node2(target=" 8.8.8.8")" which specify the node at which the ping will be tested and the target IPv4 address for the testing. Similarly, the testing function "test_port1 (host="sample.org", port=443)" can be used to test a port at the first node. Unlike the commands of "Command_Set_1" the command of "Command_Set_2" is a monitoring operation rather than testing. For example, "check_logs_at_node3" may simply check the logs passively obtained at the node. According to some embodiments, the distinction between testing operations and monitoring operations may be whether the operation causes active execution, such as a ping request, to obtain the values, as opposed to simply accessing or obtaining values that is passively collected by the tool-based monitoring system itself.

Based on transmitting the plurality of commands via the communication subsystem, the emerging fault detection system 160 may receive monitoring data and testing data comprising measurements and testing results generated from each of the plurality of tool-based monitoring systems to which the commands have been sent. Alternatively or additionally, some or all of the tool-based monitoring systems may send passively collected data automatically or execute the testing operations periodically on their own without input from the emerging fault detection system 160.

Figure 3A:
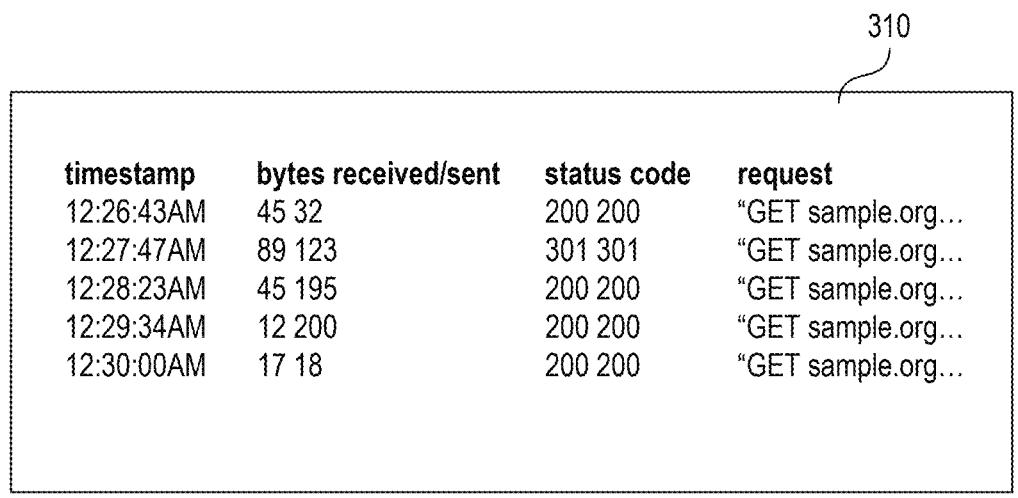
FIG. 3A illustrates an exemplary representation of monitoring data including measurements, in accordance with one or more embodiments of this disclosure.

For example, FIG. 3A illustrates an exemplary representation of monitoring data 310 including measurements, and FIG. 3B illustrates an exemplary representation of testing data 320 including testing results, in accordance with one or more embodiments of this disclosure. FIG. 3A shows, for example, lines from a load balancer's access logs. In the example of FIG. 3A, each entry may include a timestamp (e.g., a timestep), the number of bytes sent and received, status codes (e.g., "200 200" for an "okay" status), and the request (e.g., represented here by truncated request "GET sample.org . . . ").

FIG. 3B shows, for example, testing data obtained as a result of a ping test. The test may show the number of bytes transferred (e.g., "64 bytes"), the location from which the ping occurred (e.g., "8.8.8.8"), and the ping time (e.g., "47.264 ms"). The test may also yield results shown in FIG. 3B, such as "5 packets transmitted, 5 packets received, 0.0% packet loss; round-trip min/avg/max/stddev=41.070/43.675/47.398/2.888m," which indicate the number of packets transmitted and received, the percentage of packets lost, the round-trip time (rtt) statistics, and/or the like.

The communication subsystem 162 may pass the obtained data, or a pointer to the data, to the dataset generation subsystem 164. The dataset generation subsystem 164 may synthesize, using the monitoring data and the testing data from each tool-based monitoring system, an operational metric dataset comprising parameters for the operational metrics. The synthesis may include extracting the data, cleaning the data, reorganizing (e.g., sorting) the data by timestep, imputing data that is missing, etc. In some examples, the operational metrics are not directly obtained from the tool-based monitoring systems but may be calculated via measurements and testing results, e.g., as a function of measurements and testing results.

Figure 4A:
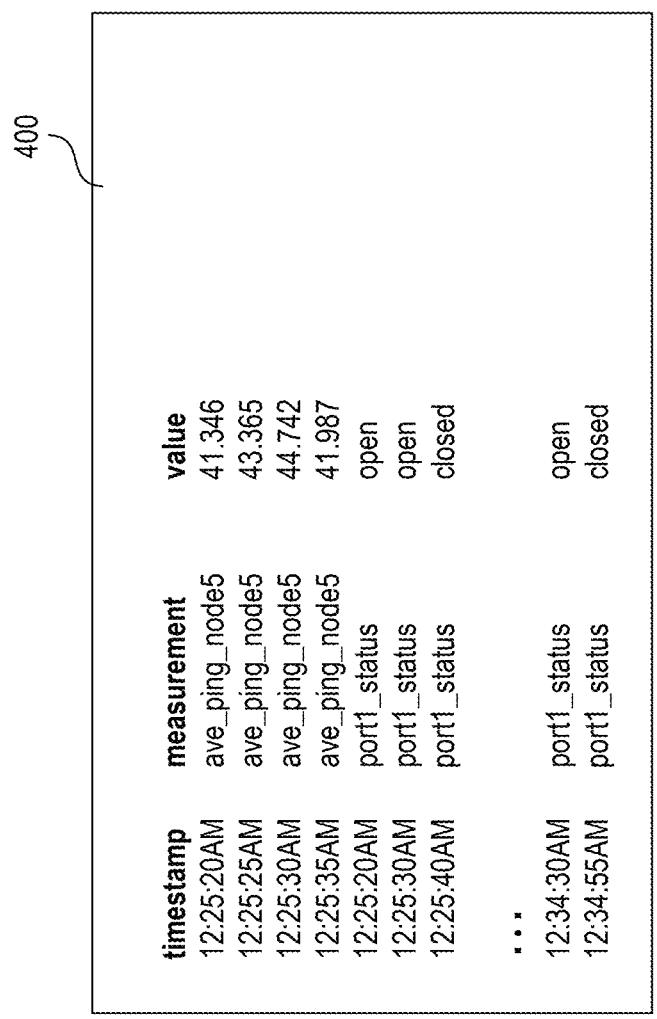
FIG. 4A illustrates an operational metric dataset, in accordance with one or more embodiments of this disclosure.

According to some examples, the operational metrics may be organized within the dataset by timesteps during the timeframe for which data was obtained. In one example, the monitoring data includes a log data structure (e.g., FIG. 3A), and synthesizing the operational metric dataset may include extracting timestamps and corresponding measurements from the log data structure and generating at least one operational metric as a function of the timestamps and the corresponding measurements. For example, metrics such as mean time between failures, mean time to repair, latency, and response time can be measured based on the timestamps (e.g., difference between the timestamps). FIG. 4A illustrates an exemplary operational metric dataset 400, in accordance with one or more embodiments of this disclosure. The operational metric dataset 400 includes values from measurements sorted by timestamp. The operational metric dataset 400 may only comprise data from time corresponding to the specific timeframe for which data was requested. In the example of FIG. 4A, the dataset may include a relevant timestamp (e.g., timestep "12:25:20 AM"), the parameter (e.g., "ave_ping_node5", "port1_status"), and the value of the parameter as measured, tested, or otherwise calculated (e.g., "41.346" "open").

The dataset generation subsystem 164 may pass the operational metric dataset to the machine learning subsystem 166 or a pointer to the data. The machine learning subsystem 166 may include one or more machine learning models configured to detect faults and generate alerts and/or commands, such as those described in relation with FIG. 7 and FIG. 8. The machine learning subsystem may input the operational metric dataset (e.g., such as dataset 400) into a fault detection machine learning model trained to predict fault conditions and degrees of the fault conditions. The model may output an indication of a fault condition, such as from a plurality of fault conditions, and a degree of the fault condition at the network system. The model may also identify where the fault condition is occurring, such as by outputting an identifier identifying a first tool-based monitoring system from which the fault condition is detected. The identifier can be any unique alphanumeric value that identifies the tool-based monitoring system at which the fault condition is likely occurring. In some examples, the identifier can include an IP address, MAC address, hostname/domain name, port numbers, logical service names, and/or the like.

The fault detection machine learning model may further output an indication as to certainty regarding the output. For example, the model may output a probabilistic output, a confidence interval or prediction interval, or other metrics for aleatoric and epistemic uncertainty. If the model is uncertain, e.g., the probabilistic output or confidence interval fails to meet or exceed a predetermined threshold for certainty, the system may seek additional data to augment the existing data and ascertain whether or not a fault exist. In particular, the system may identify the information needed and identify the commands needed to obtain the information. In some examples, there may exist multiple predetermined thresholds for each type of fault given that some faults are more important than others, where even a small risk is problematic, and other risks are non-essential, e.g., for reporting purposes. In some examples, rather than a predetermined threshold, the threshold may be dynamically determined based on the weather (e.g., some weather may make some parameters likely to vary, without a specific fix being available).

For example, responsive to determining that the degree of the fault condition indicates uncertainty of whether fault has occurred, the machine learning subsystem 166 may pass the indication, or a pointer to the indication in memory, to the command identification subsystem 168. The command identification subsystem 168 may then identify one or more second commands of a plurality of second commands associated with the indication of the fault condition. For example, the command identification subsystem 168 may identify, based on the level of uncertainty and the type of fault, which commands should be sent. For example, the commands can be identified and filtered from a plurality of commands based on where the fault is being detected, such that the commands can be sent to the tool-based monitoring system at which the fault may be emerging. Similarly, the commands could be filtered based on the type of fault as well. If the fault is likely a bandwidth issue, the commands that can be sent may be for causing further monitoring of the bandwidth or testing of the bandwidth.

In some examples, a repository, such as local or remote repository 170 may store commands. The commands may have tags identifying the types of faults for which the commands are relevant and/or tags identifying the location of the tool-based monitoring systems (e.g., nodes) for which the commands relate to. In some examples, the commands may accept parameters, such as which location to send the command to, but in this case, a tag noting the same may be unnecessary. Alternatively or additionally, the commands may be stored in data structures that store commands to be transmitted responsive to a corresponding fault type and location. In the case that the repository is remote, the communication subsystem 162 may transmit a search request for the command(s) by inserting the fault type and location, such as the identifier output by the fault detection machine learning model.

Figure 7:
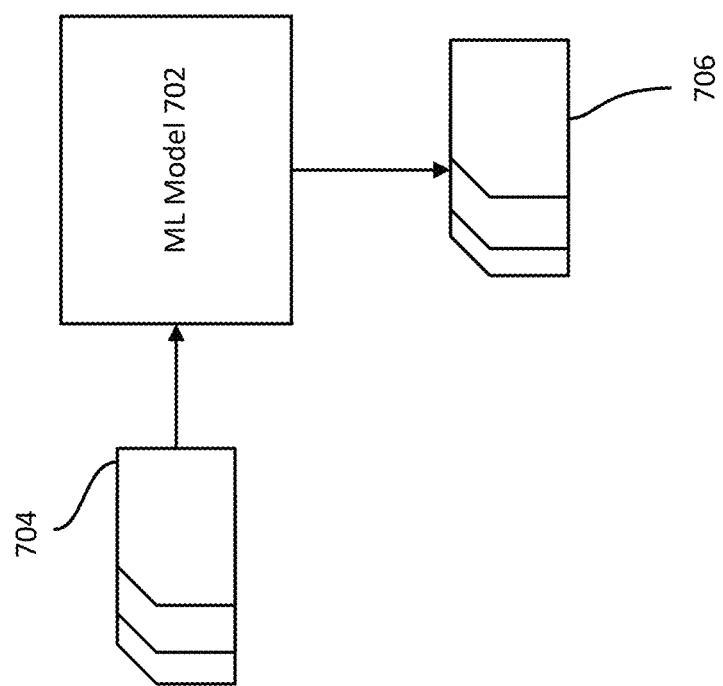
FIG. 7 illustrates an exemplary machine learning model that can be used to monitor emerging faults at a network system, in accordance with one or more embodiments of this disclosure.
Figure 8:
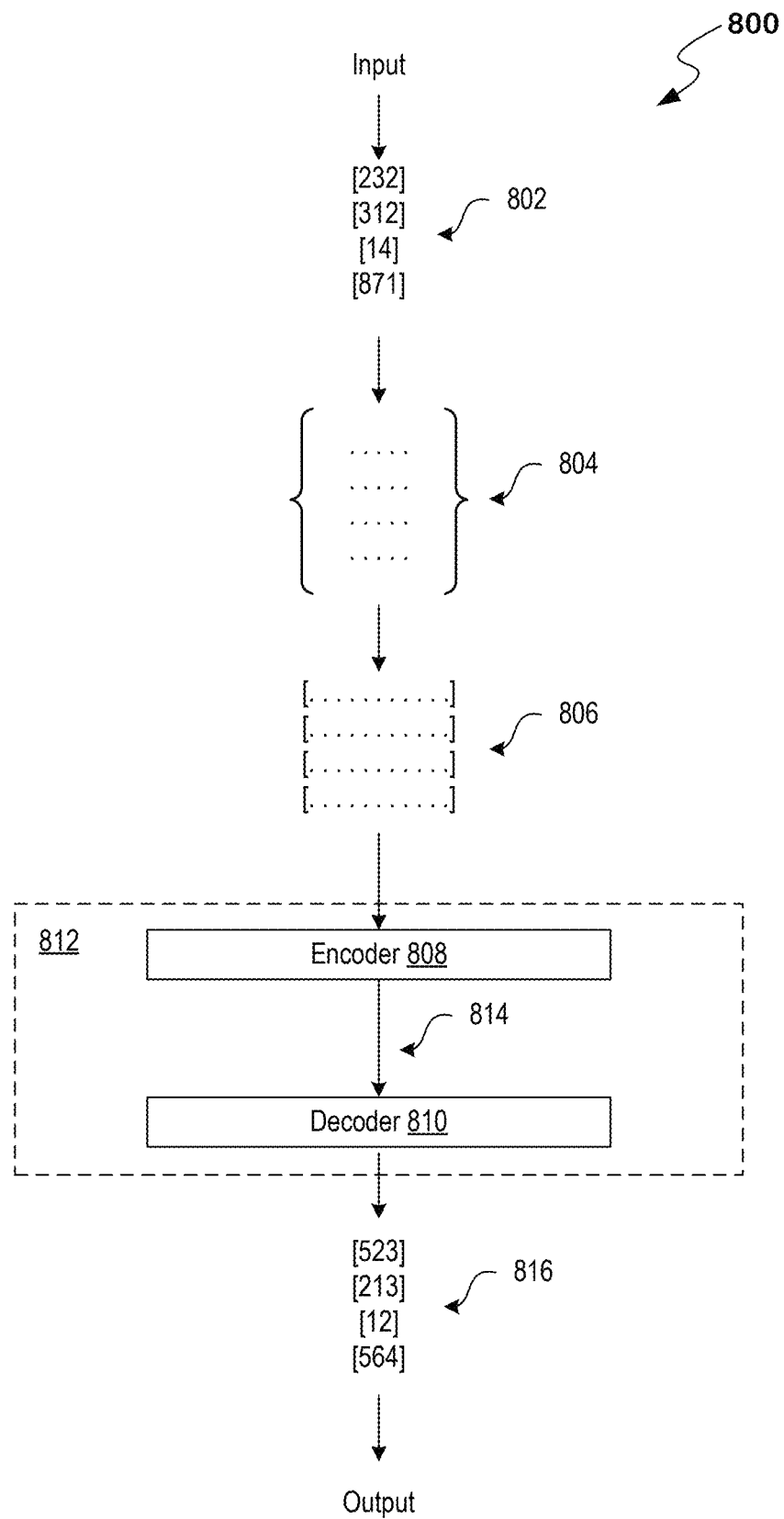
FIG. 8 is a block diagram of an example transformer that can be used to monitor emerging faults at a network system, in accordance with one or more embodiments of this disclosure.

Alternatively or additionally, the system may be configured to generate commands through a large-language model (LLM) or other machine learning model as described in relation with FIG. 7 and FIG. 8. For example, the system may prompt the model with an input such as an output from the fault detecting machine learning model indicating, for example, a fault type, the tool-based monitoring system at which the fault was potentially detected, fault severity, etc., and the model may be configured to output an executable command that can be transmitted to the tool-based monitoring system(s).

Based on transmitting the one or more commands via communication subsystem 162 via the network, the system may obtain additional parameters for generating an augmented operational metric dataset. For example, the commands may be transmitted to one or more tool-based monitoring systems to which the commands correspond. Once the monitoring and/or testing operations are executed at respective tool-based monitoring systems, the resulting data may be transmitted to the emerging fault detection system 160 via the network. The communication subsystem 162 may pass the data or a point to the data in memory to the dataset generation subsystem 164, where an augmented dataset may be generated. In some examples, the commands may correspond to a next timeframe.

Figure 4B:
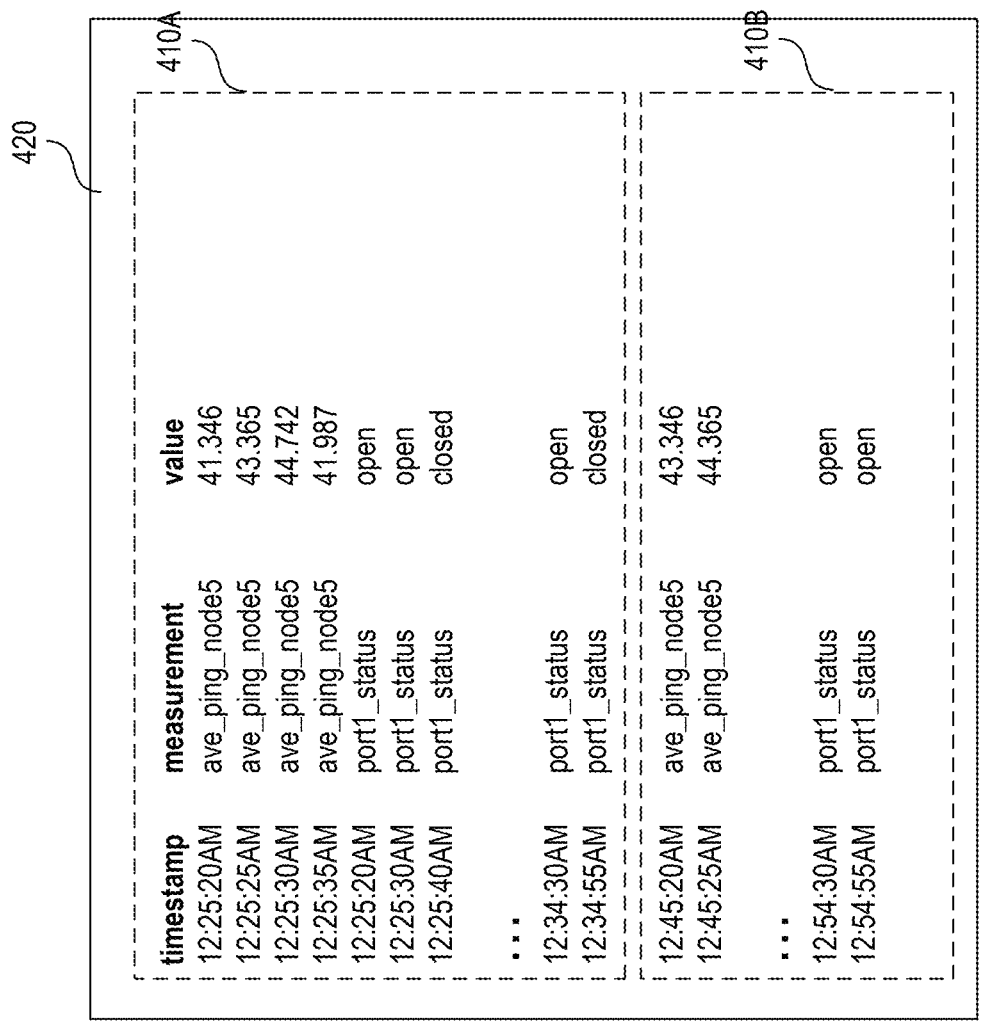
FIG. 4B illustrates an augmented operational metric dataset, in accordance with one or more embodiments of this disclosure.

For example, FIG. 4B illustrates an augmented operational metric dataset 420, in accordance with one or more embodiments of this disclosure. In some examples, the augmented operational metric dataset 420 may be a result of the concatenation between the operational metrics from the previously obtained data (e.g., 410A) and the operational metrics newly generated (e.g., calculated, extracted, etc.) using data received from the second commands (e.g., 410B). The dataset generation subsystem 164 may pass the augmented operational metric dataset or a pointer to the dataset in memory to the machine learning subsystem 166.

The machine learning subsystem 166 may input the augmented operational metric dataset into the fault detection machine learning model (e.g., the same model) to obtain an updated indication of the fault condition and updated degree of the fault condition. According to some embodiments, if the confidence level or other metric shows that the updated indication of the fault condition and updated degree of the fault condition are still uncertain (e.g., still failing to meet or exceeding a predetermined threshold), the system may identify yet further data via new commands and reinput the data into the model until the threshold for certainty is met.

Based on the updated indication of the fault condition indicating the fault in the network system, the communication subsystem 162 may be used to transmit an alert to an operator device, such as operator device 150. According to some examples, the content of the alert, such as text of the alert, may be generated using a machine learning model as described herein. For example, a prompt such as the type of fault, location of the fault, and/or data relating to the fault (e.g., measurements) may be input to an LLM that may be configured to output natural language for inserting into a GUI of a display sent to the operator device. For example, the prompt could include "error code 4, node5, high" and the LLM may be configured to generate an output such as "Hello, immediate assistance is needed at computing system number 5. A connectivity failure has been noted causing issues with website loading." Furthermore, the LLM may be configured to identify the specific operator or operator device for which specific types of faults should be alerted.

According to some embodiments, responsive to determining that the degree of the fault condition indicates uncertainty of whether the fault has occurred, the system may obtain historical monitoring data and historical testing data to help ascertain whether a fault has occurred as well. In particular, the system may obtain data generated during a predetermined number of past timeframes, e.g., where each timeframe of the predetermined number of timeframes precedes the first timeframe. The system may generate a vector for input into a machine learning model by aggregating the historical monitoring data and the historical testing data. The system may also impute missing data, extract data, calculate specific metrics based on the data, etc., prior to or after aggregation. In some examples, the machine learning model may be the same fault detection machine learning model. Alternatively, the model may be a temporal fault detection machine learning model. The temporal fault detection machine learning model may be trained to identify temporal patterns indicative of the emerging faults. The system may then input the vector into the temporal fault detection machine learning model and obtain, as output, one or more indications of an emerging fault. In some examples, responsive to an operator input that indicates that the temporal pattern is not indicative of one or more emerging faults, the system may cause retraining of the fault detection machine learning model.

In some examples, the system may further calculate, based on the historical monitoring data and the historical testing data, extrapolated values having a second plurality of timesteps during a successive timeframe following the first timeframe. For example, the system may extrapolate and, responsive to determining that at least one of the extrapolated values exceeds a predetermined threshold, generate commands for displaying the extrapolated values at a user interface of the operator device. For example, the system may utilize extrapolation techniques such as linear extrapolation, polynomial extrapolation, logarithmic extrapolation, moving average extrapolation, regression-based, spline, Fourier extrapolation, and/or the like. The command(s) can then be transmitted to the operator device, e.g., such that the operator may view and make further determinations on how to proceed.

According to some examples, responsive to the indication of the fault condition, the system may automatically generate commands for monitoring the additional parameters at a first tool-based monitoring system from which the fault condition is detected to be occurring. The machine learning subsystem 166 may periodically input the additional parameters into the fault detection machine learning model to obtain a new indication of the fault condition and a new degree of the fault condition. Based on detecting that the new degree of the fault condition is less than a predetermined threshold degree, the system may transmit a second alert to the operator device.

Figure 5:
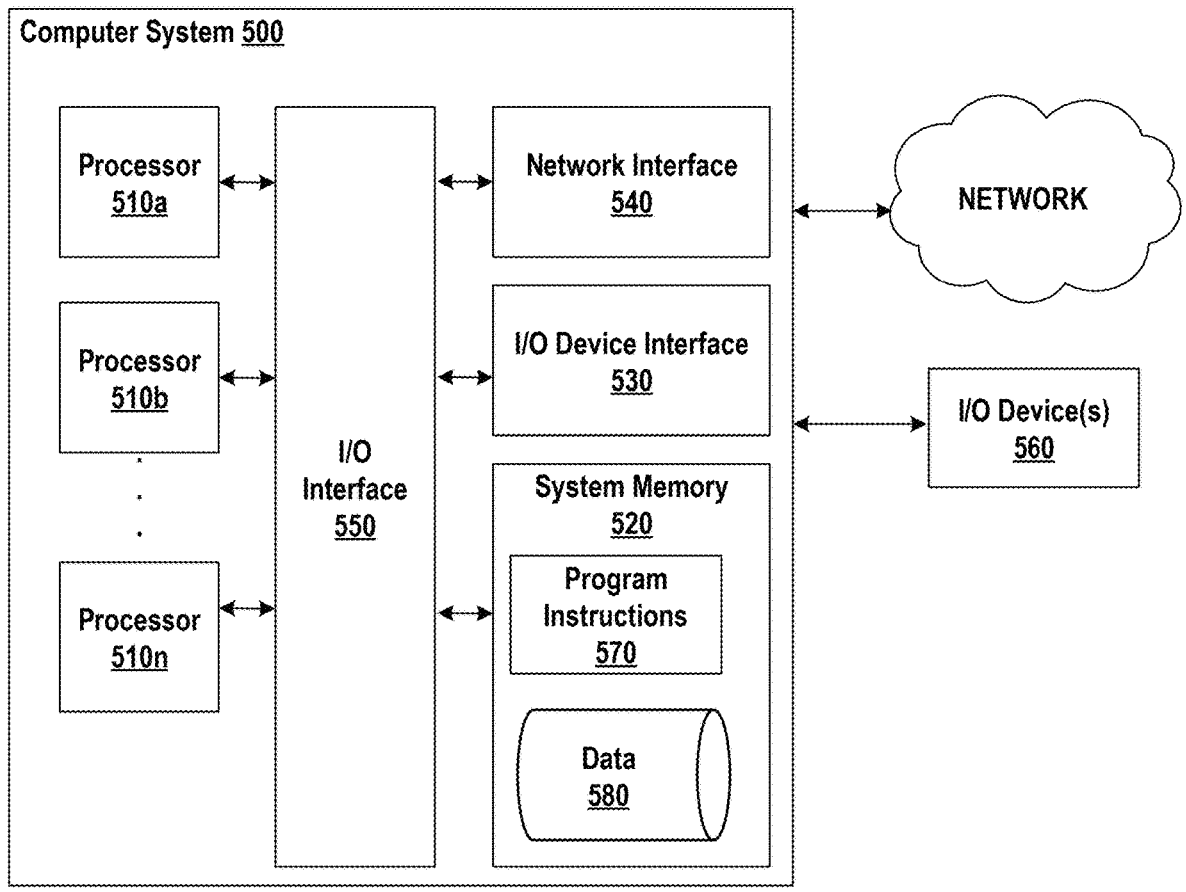
FIG. 5 illustrates a computing system that can be used for monitoring emerging faults at a network system, in accordance with one or more embodiments of this disclosure.

FIG. 5 shows an example computing system that may be used in accordance with some embodiments of this disclosure. In some instances, computing system 500 is referred to as a computer system 500. A person skilled in the art would understand that those terms may be used interchangeably. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions.

A processor may include a programmable processor. A processor may include general or special purpose microprocessors. A processor may receive instructions and data from a memory (e.g., system memory 520). Computing system 500 may be a uni-processor system including one processor (e.g., processor 510a), or a multiprocessor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

The I/O device interface 530 and I/O devices 560 may be used to enable manipulation of the three-dimensional model as well. For example, the user may be able to use I/O devices such as a keyboard and touchpad to indicate specific selections for nodes, adjust values for nodes, select from the history of machine learning models, select specific inputs or outputs, and/or the like. Alternatively or additionally, the user may use their voice to indicate specific nodes, specific models, and/or the like via the voice recognition device and/or microphones.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the internet, a LAN, a WAN, a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated or may operate as a stand-alone system. In addition, the functionality provided by the illustrated components may, in some embodiments, be combined in fewer components, or be distributed in additional components. Similarly, in some embodiments, the functionality of some of the illustrated components may not be provided, or other additional functionality may be available.

Figure 6:
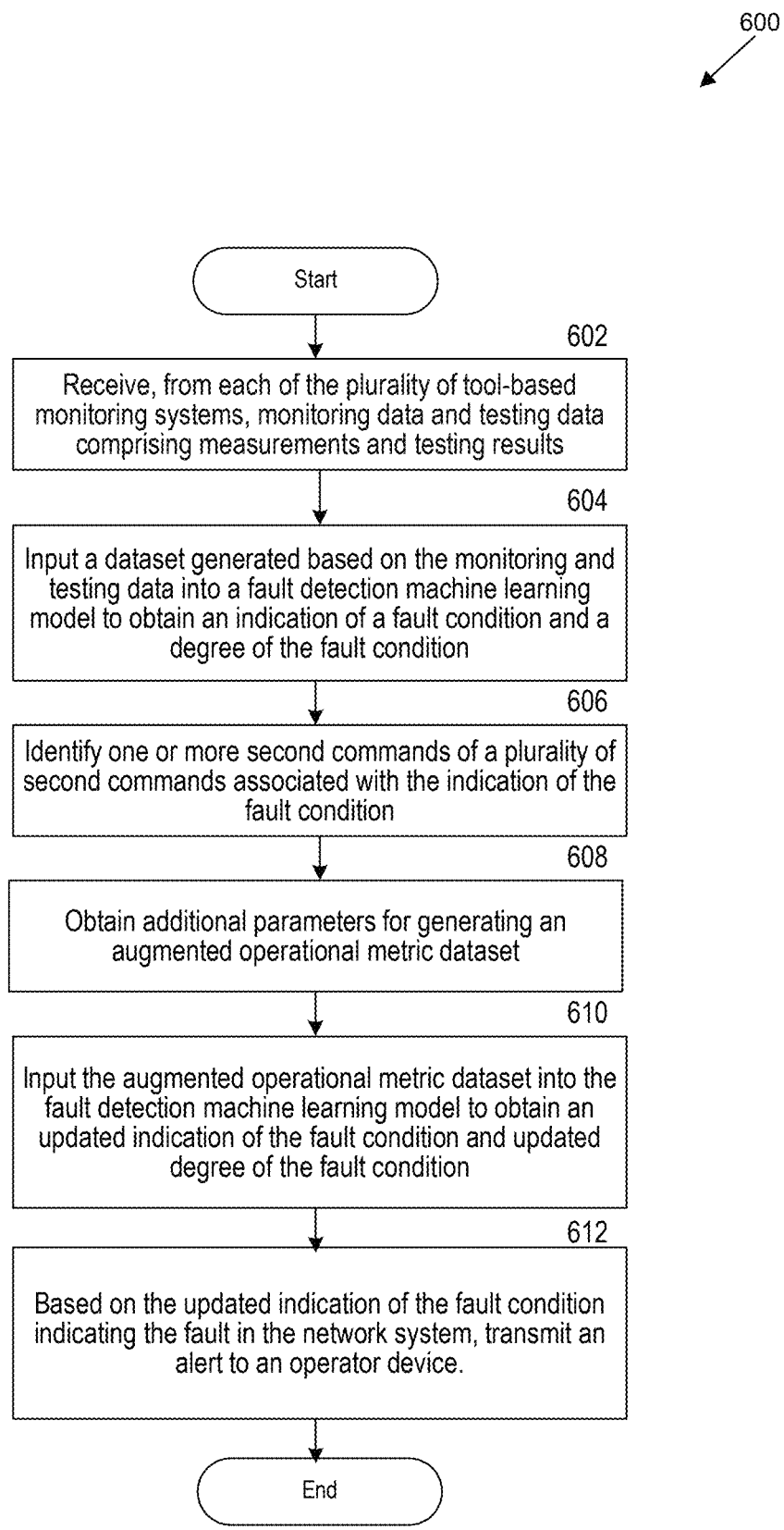
FIG. 6 is a flowchart of operations for monitoring emerging faults at a network system, in accordance with one or more embodiments of this disclosure.

FIG. 6 is a flowchart 600 of operations for monitoring emerging faults, such as in a network system, in accordance with one or more embodiments of this disclosure. The operations of FIG. 6 may use components described in relation to FIG. 5. In some embodiments, emerging fault detection system 160 may include one or more components of computer system 500.

At operation 602, one or more of processors 510a-510n receive, from each of the plurality of tool-based monitoring systems, monitoring data and testing data comprising measurements and testing results. As described herein, the data may be obtained as result of commands generated and transmitted via one or more of processors 510a-510n. One or more of processors 510a-510n may receive the data over communication network 140 using network interface 540.

At operation 604, one or more of processors 510a-510n may input a dataset generated based on the monitoring and testing data into a fault detection machine learning model to obtain an indication of a fault condition and a degree of the fault condition. According to some examples, as described herein, the fault detection machine learning model may be trained to predict fault conditions and degrees of the fault conditions and the fault condition may be identified from a plurality of potential fault conditions.

At operation 606, one or more of processors 510a-510n identify one or more second commands of a plurality of second commands associated with the indication of the fault condition. In some examples, the processor(s) may identify the commands responsive to determining that the degree of the fault condition indicates uncertainty of whether a fault has occurred.

At operation 608, one or more of processors 510a-510n may obtain additional parameters for generating an augmented operational metric dataset. For example, the additional parameters may be obtained as a result of the one or more second commands, e.g., based on transmitting the one or more second commands.

At operation 610, one or more of processors 510a-510n input the augmented operational metric dataset into the fault detection machine learning model to obtain an updated indication of the fault condition and updated degree of the fault condition. At operation 612, one or more of processors 510a-510n, based on the updated indication of the fault condition indicating the fault in the network system, transmit an alert to an operator device. For example, the operator device 150 may receive an alert and, in some examples, may be enabled to respond or cause further action to fix the emerging issue.

FIG. 7 illustrates an exemplary machine learning model 702 (e.g., the fault detection machine learning model, temporal fault detection machine learning model). According to some examples, the machine learning model may be any model, such as a model for classification. For example, the machine learning model may be trained to intake input 704, including input data received. As a result of inputting the input 704 into the machine learning model, the model may then output an output 706. As described herein, the input data can include data such as the operational metric dataset, the augmented operational metric dataset, or a vectorized version of either datasets.

The output 706 may include an indication of the fault condition, such as a label for the type of fault (e.g., "latency", "connectivity", etc.) and a degree of the fault condition, which may be a numerical rating indicating the severity, or may be a classification (e.g., "severe," "moderate," or "low"). Furthermore, as described, the machine learning model may be configured to output a confidence interval or other metric for certainty regarding the other outputs. The machine learning model may have been trained on a training dataset containing a plurality of operational metric datasets and labels such as a degree and indication for faults that were identified by operators, for example. An exemplary machine learning model is described in relation to FIG. 7 herein.

The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction and reference feedback information (e.g., user indication of accuracy, reference labels, or other information). Connection weights may be adjusted, for example, if the machine learning model is a neural network, to reconcile differences between the neural network's prediction and the reference feedback.

One or more neurons of the neural network may require that their respective errors are sent backward through the neural network to facilitate the update process (e.g., back-propagation of error). Updates to the connection weights may, for example, be reflective of the magnitude of error propagated backward after a forward pass has been completed. In this way, for example, the machine learning model may be trained to generate better predictions for whether a fault exists, what type of fault it is, the severity, and/or where the fault is located.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model may be self-learning and/or trained rather than explicitly programmed and may perform significantly better in certain areas of problem-solving as compared to computer programs that do not use machine learning. During training, an output layer of the machine learning model may correspond to a classification of the machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector. The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language, e.g., for alerts to operators, or commands that have been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

FIG. 8 is a block diagram 800 of an example transformer 812. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 812 includes an encoder 808 (which can include one or more encoder layers/blocks connected in series) and a decoder 810 (which can include one or more decoder layers/blocks connected in series). Generally, the encoder 808 and the decoder 810 each include multiple neural network layers, at least one of which can be a self-attention layer. The parameters of the neural network layers can be referred to as the parameters of the language model.

The transformer 812 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 812 is trained to perform certain functions on other input formats than natural language input. For example, the input can include objects, images, audio content, or video content, or a combination thereof.

As described herein, such a model may be used in order to generate commands, e.g., such as those to effectuate operations for monitoring and testing at tool-based monitoring systems, as well as for potentially transmitting data from those operations to the system.

The transformer 812 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 8 illustrates an example of how the transformer 812 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 8, a short sequence of tokens 802 corresponding to the input text is illustrated as input to the transformer 812. Tokenization of the text sequence into the tokens 802 can be performed by some pre-processing tokenization module such as, for example, a byte-pair encoding tokenizer (the "pre" referring to the tokenization occurring prior to the processing of the tokenized input by the LLM), which is not shown in FIG. 8 for brevity. In general, the token sequence that is inputted to the transformer 812 can be of any length up to a maximum length defined based on the dimensions of the transformer 812. Each token 802 in the token sequence is converted into an embedding 806 (also referred to as "embedding vector").

An embedding 806 is a learned numerical representation (such as, for example, a vector) of a token that captures some semantic meaning of the text segment represented by the token 802. The embedding 806 represents the text segment corresponding to the token 802 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 806 corresponding to the "write" token will be closer to another embedding corresponding to the "jot down" token in the vector space as compared to the distance between the embedding 806 corresponding to the "write" token and another embedding corresponding to the "summary" token.

The vector space can be defined by the dimensions and values of the embedding vectors. Various techniques can be used to convert a token 802 to an embedding 806. For example, another trained ML model can be used to convert the token 802 into an embedding 806. In particular, another trained ML model can be used to convert the token 802 into an embedding 806 in a way that encodes additional information into the embedding 806 (e.g., a trained ML model can encode positional information about the position of the token 802 in the text sequence into the embedding 806). In some implementations, the numerical value of the token 802 can be used to look up the corresponding embedding in an embedding matrix 804, which can be learned during training of the transformer 812.

The generated embeddings, e.g., such as embedding 806, are input into the encoder 808. The encoder 808 serves to encode the embedding 806 into feature vectors 814 that represent the latent features of the embedding 806. The encoder 808 can encode positional information (i.e., information about the sequence of the input) in the feature vectors 814. The feature vectors 814 can have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as feature vectors 814 that can be generated by the encoder 808 can be referred to as a latent space or feature space.

Conceptually, the decoder 810 is designed to map the features represented by the feature vectors 814 into meaningful output, which can depend on the task that was assigned to the transformer 812. For example, if the transformer 812 is used for a translation task, the decoder 810 can map the feature vectors 814 into text output in a target language different from the language of the original tokens 802. Generally, in a generative language model, the decoder 810 serves to decode the feature vectors 814 into a sequence of tokens. The decoder 810 can generate output tokens 816 one by one. Each output token 816 can be fed back as input to the decoder 810 in order to generate the next output token 816. By feeding back the generated output and applying self-attention, the decoder 810 can generate a sequence of output tokens 816 that has sequential meaning (e.g., the resulting output text sequence is understandable as a sentence and obeys grammatical rules). The decoder 810 can generate output tokens 816 until a special [EOT] token (indicating the end of the text) is generated. The resulting sequence of output tokens 816 can then be converted to a text sequence in post-processing. For example, each output token 816 can be an integer number that corresponds to a vocabulary index. By looking up the text segment using the vocabulary index, the text segment corresponding to each output token 816 can be retrieved, the text segments can be concatenated together, and the final output text sequence can be obtained.

In some implementations, the input provided to the transformer 812 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: generating a plurality of commands for a plurality of tool-based monitoring systems, wherein the plurality of commands comprises a command to execute a monitoring operation and a testing operation at the plurality of tool-based monitoring systems to obtain operational metrics corresponding to a first timeframe; based on transmitting the plurality of commands, receiving, from each of the plurality of tool-based monitoring systems, monitoring data and testing data comprising measurements and testing results generated during the first timeframe; synthesizing, using the monitoring data and the testing data from each tool-based monitoring system, an operational metric dataset comprising parameters for the operational metrics having a plurality of timesteps during the first timeframe; inputting the operational metric dataset into a fault detection machine learning model to obtain (1) an indication of a fault condition of a plurality of fault conditions and a degree of the fault condition at the network system and (2) an identifier identifying a first tool-based monitoring system from which the fault condition is detected, wherein the fault detection machine learning model is trained to predict fault conditions and degrees of the fault conditions; responsive to determining that the degree of the fault condition indicates uncertainty of whether fault has occurred, identifying one or more second commands of a plurality of second commands associated with the indication of the fault condition; based on transmitting the one or more second commands, obtaining additional parameters for generating an augmented operational metric dataset; inputting the augmented operational metric dataset into the fault detection machine learning model to obtain an updated indication of the fault condition and updated degree of the fault condition; and based on the updated indication of the fault condition indicating the fault in the network system, transmitting an alert to an operator device.

2. A method comprising: based on transmitting one or more commands to a plurality of tool-based monitoring systems, receiving, from each of the plurality of tool-based monitoring systems, monitoring data and testing data comprising measurements and testing results generated during a first timeframe; inputting an operational metric dataset generated based on the monitoring data and the testing data into a fault detection machine learning model to obtain an indication of a fault condition of a plurality of fault conditions and a degree of the fault condition at the network system, wherein the fault detection machine learning model is trained to predict fault conditions and degrees of the fault conditions; responsive to determining that the degree of the fault condition indicates uncertainty of whether fault has occurred, identifying one or more second commands of a plurality of second commands associated with the indication of the fault condition; based on transmitting the one or more second commands, obtaining additional parameters for generating an augmented operational metric dataset; inputting the augmented operational metric dataset into the fault detection machine learning model to obtain an updated indication of the fault condition and updated degree of the fault condition; and based on the updated indication of the fault condition indicating the fault in the network system, transmitting an alert to an operator device.

3. A method comprising: based on transmitting one or more commands, receiving, from each of a plurality of tool-based monitoring systems, monitoring data and testing data comprising measurements and testing results generated during a first timeframe; inputting an operational metric dataset generated based on the monitoring data and the testing data into a fault detection machine learning model to obtain an indication of a fault condition of a plurality of fault conditions and a degree of the fault condition at the network system, wherein the fault detection machine learning model is trained to predict fault conditions and degrees of the fault conditions; responsive to determining that the degree of the fault condition indicates uncertainty of whether fault has occurred, identifying one or more second commands of a plurality of second commands associated with the indication of the fault condition; based on transmitting the one or more second commands, obtaining additional parameters for generating an augmented operational metric dataset; inputting the augmented operational metric dataset into the fault detection machine learning model to obtain an updated indication of the fault condition and updated degree of the fault condition; and based on the updated indication of the fault condition indicating a fault in the network system, transmitting an alert to an operator device.

4. The method of any of the preceding embodiments, further comprising: generating the one or more commands for the plurality of tool-based monitoring systems, wherein the one or more commands comprise a command to execute a monitoring operation and a testing operation at the plurality of tool-based monitoring systems to obtain operational metrics corresponding to the first timeframe.

5. The method of any of the preceding embodiments, further comprising: synthesizing, using the monitoring data and the testing data from each tool-based monitoring system, the operational metric dataset comprising parameters for the operational metrics having a plurality of timesteps during the first timeframe.

6. The method of any of the preceding embodiments, wherein the monitoring data comprises a log data structure and synthesizing the operational metric dataset comprises: extracting timestamps and corresponding measurements from the log data structure and generating at least one operational metric as a function of the timestamps and the corresponding measurements.

7. The method of any of the preceding embodiments, further comprising: responsive to determining that the degree of the fault condition indicates the uncertainty of whether the fault has occurred, obtaining historical monitoring data and historical testing data generated during a predetermined number of timeframes, wherein each timeframe of the predetermined number of timeframes precedes the first timeframe; generating a vector for input into a temporal fault detection machine learning model by aggregating the historical monitoring data and the historical testing data, wherein the temporal fault detection machine learning model is trained to identify temporal patterns indicative of the emerging faults; and inputting the vector into the temporal fault detection machine learning model and obtaining, as output, one or more indications of an emerging fault.

8. The method of any of the preceding embodiments, further comprising: responsive to determining that the degree of the fault condition indicates the uncertainty of whether the fault has occurred, obtaining historical monitoring data and historical testing data generated during a predetermined number of timeframes, wherein the predetermined number of timeframes precede the first timeframe; calculating, based on the historical monitoring data and the historical testing data, extrapolated values having a second plurality of timesteps during a successive timeframe following the first timeframe; responsive to determining that at least one of the extrapolated values exceeds a predetermined threshold, generating commands for displaying the extrapolated values at a user interface of the operator device; and transmitting the one or more commands at the operator device.

9. The method of any of the preceding embodiments, further comprising: responsive to the indication of the fault condition, automatically generating commands for monitoring the additional parameters at a first tool-based monitoring system from which the fault condition is detected to be occurring; periodically inputting the additional parameters into the fault detection machine learning model to obtain a new indication of the fault condition and a new degree of the fault condition; and based on detecting that the new degree of the fault condition is less than a predetermined threshold degree, transmitting a second alert to the operator device.

10. One or more tangible, non-transitory, computer-readable media storing instructions that, when executed by a data processing apparatus, cause the data processing apparatus to perform operations comprising those of any of embodiments 1-9.

11. A system comprising: one or more processors; and memory storing instructions that, when executed by the one or more processors, cause the processors to effectuate operations comprising those of any of embodiments 1-9.

12. A system comprising means for performing any of embodiments 1-9.

13. A system comprising cloud-based circuitry for performing any of embodiments 1-9.

What is claimed is:

1. A system for monitoring emerging faults at a network system, the system comprising:
one or more processors; and
one or more non-transitory, computer-readable media comprising instructions that, when executed by the one or more processors, cause operations comprising:
generating a plurality of commands for a plurality of tool-based monitoring systems, wherein the plurality of commands comprises a command to execute a monitoring operation and a testing operation at the plurality of tool-based monitoring systems to obtain operational metrics corresponding to a first timeframe;
based on transmitting the plurality of commands, receiving, from each of the plurality of tool-based monitoring systems, monitoring data and testing data comprising measurements and testing results generated during the first timeframe;
synthesizing, using the monitoring data and the testing data from each tool-based monitoring system, an operational metric dataset comprising parameters for the operational metrics having a plurality of timesteps during the first timeframe;
inputting the operational metric dataset into a fault detection machine learning model to obtain (1) an indication of a fault condition of a plurality of fault conditions and a degree of the fault condition at the network system and (2) an identifier identifying a first tool-based monitoring system from which the fault condition is detected, wherein the fault detection machine learning model is trained to predict fault conditions and degrees of the fault conditions;
responsive to determining that the degree of the fault condition indicates a certainty regarding occurrence of a fault, stopping execution of the process by refraining from identifying further second commands;
responsive to determining that the degree of the fault condition indicates uncertainty of whether fault has occurred, identifying one or more second commands of a plurality of second commands associated with the indication of the fault condition;
based on transmitting the one or more second commands, obtaining additional parameters for generating an augmented operational metric dataset;
inputting the augmented operational metric dataset into the fault detection machine learning model to obtain an updated indication of the fault condition and updated degree of the fault condition; and
based on the updated indication of the fault condition indicating the fault in the network system, transmitting an alert to an operator device.

2. The system of claim 1, wherein the instructions further cause the one or more processors to perform operations comprising:
responsive to determining that the degree of the fault condition indicates the uncertainty of whether the fault has occurred, obtaining historical monitoring data and historical testing data generated during a predetermined number of timeframes, wherein each timeframe of the predetermined number of timeframes precedes the first timeframe;
generating a vector for input into a temporal fault detection machine learning model by aggregating the historical monitoring data and the historical testing data, wherein the temporal fault detection machine learning model is trained to identify temporal patterns indicative of the emerging faults; and
inputting the vector into the temporal fault detection machine learning model and obtaining, as output, one or more indications of an emerging fault.

3. The system of claim 1, wherein the instructions further cause the one or more processors to perform operations comprising:
responsive to determining that the degree of the fault condition indicates the uncertainty of whether the fault has occurred, obtaining historical monitoring data and historical testing data generated during a predetermined number of timeframes, wherein the predetermined number of timeframes precede the first timeframe;
calculating, based on the historical monitoring data and the historical testing data, extrapolated values having a second plurality of timesteps during a successive timeframe following the first timeframe;
responsive to determining that at least one of the extrapolated values exceeds a predetermined threshold, generating one or more commands for displaying the extrapolated values at a user interface of the operator device; and
transmitting the one or more commands at the operator device.

4. The system of claim 1, wherein the instructions further cause the one or more processors to perform operations including:

responsive to the indication of the fault condition, automatically generating commands for monitoring the additional parameters at the first tool-based monitoring system;
periodically inputting the additional parameters into the fault detection machine learning model to obtain a new indication of the fault condition and a new degree of the fault condition; and
based on detecting that the new degree of the fault condition is less than a predetermined threshold degree, transmitting a second alert to the operator device.

5. The system of claim 1, wherein the monitoring data comprises a log data structure and synthesizing the operational metric dataset comprises:
extracting timestamps and corresponding measurements from the log data structure; and
generating at least one operational metric as a function of the timestamps and the corresponding measurements.

6. A method for monitoring emerging faults at a network system, the method comprising:
based on transmitting one or more commands to a plurality of tool-based monitoring systems, receiving, from each of the plurality of tool-based monitoring systems, monitoring data and testing data comprising measurements and testing results generated during a first timeframe;
inputting an operational metric dataset generated based on the monitoring data and the testing data into a fault detection machine learning model to obtain an indication of a fault condition of a plurality of fault conditions and a degree of the fault condition at the network system, wherein the fault detection machine learning model is trained to predict fault conditions and degrees of the fault conditions;
responsive to determining that the degree of the fault condition indicates a certainty regarding occurrence of a fault, stopping execution of the process by refraining from identifying further second commands;
responsive to determining that the degree of the fault condition indicates uncertainty of whether fault has occurred, identifying one or more second commands of a plurality of second commands associated with the indication of the fault condition;
based on transmitting the one or more second commands, obtaining additional parameters for generating an augmented operational metric dataset;
inputting the augmented operational metric dataset into the fault detection machine learning model to obtain an updated indication of the fault condition and updated degree of the fault condition; and
based on the updated indication of the fault condition indicating the fault in the network system, transmitting an alert to an operator device.

7. The method of claim 6, wherein the method further comprises:
generating the one or more commands for the plurality of tool-based monitoring systems, wherein the one or more commands comprise a command to execute a monitoring operation and a testing operation at the plurality of tool-based monitoring systems to obtain operational metrics corresponding to the first timeframe.

8. The method of claim 7, wherein the method further comprises:
synthesizing, using the monitoring data and the testing data from each tool-based monitoring system, the operational metric dataset comprising parameters for the operational metrics having a plurality of timesteps during the first timeframe.

9. The method of claim 8, wherein the monitoring data comprises a log data structure and synthesizing the operational metric dataset comprises:
extracting timestamps and corresponding measurements from the log data structure; and
generating at least one operational metric as a function of the timestamps and the corresponding measurements.

10. The method of claim 6, wherein the method further comprises:
responsive to determining that the degree of the fault condition indicates the uncertainty of whether the fault has occurred, obtaining historical monitoring data and historical testing data generated during a predetermined number of timeframes, wherein each timeframe of the predetermined number of timeframes precedes the first timeframe;
generating a vector for input into a temporal fault detection machine learning model by aggregating the historical monitoring data and the historical testing data, wherein the temporal fault detection machine learning model is trained to identify temporal patterns indicative of the emerging faults; and
inputting the vector into the temporal fault detection machine learning model and obtaining, as output, one or more indications of an emerging fault.

11. The method of claim 6, further comprising:
responsive to determining that the degree of the fault condition indicates the uncertainty of whether the fault has occurred, obtaining historical monitoring data and historical testing data generated during a predetermined number of timeframes, wherein the predetermined number of timeframes precede the first timeframe;
calculating, based on the historical monitoring data and the historical testing data, extrapolated values having a second plurality of timesteps during a successive timeframe following the first timeframe;
responsive to determining that at least one of the extrapolated values exceeds a predetermined threshold, generating commands for displaying the extrapolated values at a user interface of the operator device; and
transmitting the one or more commands at the operator device.

12. The method of claim 6, further comprising:
responsive to the indication of the fault condition, automatically generating commands for monitoring the additional parameters at a first tool-based monitoring system from which the fault condition is detected to be occurring;
periodically inputting the additional parameters into the fault detection machine learning model to obtain a new indication of the fault condition and a new degree of the fault condition; and
based on detecting that the new degree of the fault condition is less than a predetermined threshold degree, transmitting a second alert to the operator device.

13. One or more non-transitory, computer-readable media comprising instructions recorded thereon that, when executed by one or more processors, cause operations for monitoring emerging faults at a network system, comprising:
based on transmitting one or more commands, receiving, from each of a plurality of tool-based monitoring systems, monitoring data and testing data comprising measurements and testing results generated during a first timeframe;

inputting an operational metric dataset generated based on the monitoring data and the testing data into a fault detection machine learning model to obtain an indication of a fault condition of a plurality of fault conditions and a degree of the fault condition at the network system, wherein the fault detection machine learning model is trained to predict fault conditions and degrees of the fault conditions;

responsive to determining that the degree of the fault condition indicates a certainty regarding occurrence of a fault, stopping execution of the process by refraining from identifying further second commands;

responsive to determining that the degree of the fault condition indicates uncertainty of whether fault has occurred, identifying one or more second commands of a plurality of second commands associated with the indication of the fault condition;

based on transmitting the one or more second commands, obtaining additional parameters for generating an augmented operational metric dataset;

inputting the augmented operational metric dataset into the fault detection machine learning model to obtain an updated indication of the fault condition and an updated degree of the fault condition; and based on the updated indication of the fault condition indicating a fault in the network system, transmitting an alert to an operator device.

14. The one or more non-transitory, computer-readable media of claim 13, wherein the instructions further cause the one or more processors to perform operations comprising:

generating the one or more commands for the plurality of tool-based monitoring systems, wherein the one or more commands comprise a command to execute a monitoring operation and a testing operation at the plurality of tool-based monitoring systems to obtain operational metrics corresponding to the first timeframe.

15. The one or more non-transitory, computer-readable media of claim 14, wherein the instructions further cause the one or more processors to perform operations comprising:

synthesizing, using the monitoring data and the testing data from each tool-based monitoring system, the operational metric dataset comprising parameters for the operational metrics having a plurality of timesteps during the first timeframe.

16. The one or more non-transitory, computer-readable media of claim 15, wherein the monitoring data comprises a log data structure and synthesizing the operational metric dataset comprises:

extracting timestamps and corresponding measurements from the log data structure; and generating at least one operational metric as a function of the timestamps and the corresponding measurements.

17. The one or more non-transitory, computer-readable media of claim 13, wherein the instructions further cause the one or more processors to perform operations comprising:

responsive to determining that the degree of the fault condition indicates the uncertainty of whether the fault has occurred, obtaining historical monitoring data and historical testing data generated during a predetermined number of timeframes, wherein each timeframe of the predetermined number of timeframes precedes the first timeframe;

generating a vector for input into a temporal fault detection machine learning model by aggregating the historical monitoring data and the historical testing data, wherein the temporal fault detection machine learning model is trained to identify temporal patterns indicative of the emerging faults; and inputting the vector into the temporal fault detection machine learning model and obtaining, as output, one or more indications of an emerging fault.

18. The one or more non-transitory, computer-readable media of claim 17, wherein the instructions further cause the one or more processors to perform operations comprising:

responsive to operator input from the operator device that a temporal pattern is not indicative of one or more emerging faults, causing retraining of the fault detection machine learning model.

19. The one or more non-transitory, computer-readable media of claim 13, wherein the instructions further cause the one or more processors to perform operations comprising:

responsive to determining that the degree of the fault condition indicates the uncertainty of whether the fault has occurred, obtaining historical monitoring data and historical testing data generated during a predetermined number of timeframes, wherein the predetermined number of timeframes precede the first timeframe;

calculating, based on the historical monitoring data and the historical testing data, extrapolated values having a second plurality of timesteps during a successive timeframe following the first timeframe;

responsive to determining that at least one of the extrapolated values exceeds a predetermined threshold, generating commands for displaying the extrapolated values at a user interface of the operator device; and transmitting the one or more commands at the operator device.

20. The one or more non-transitory, computer-readable media of claim 13, wherein the instructions further cause the one or more processors to perform operations comprising:

responsive to the indication of the fault condition, automatically generating commands for monitoring the additional parameters at a first tool-based monitoring system from which the fault condition is detected to be occurring;

periodically inputting the additional parameters into the fault detection machine learning model to obtain a new indication of the fault condition and a new degree of the fault condition; and based on detecting that the new degree of the fault condition is less than a predetermined threshold degree, transmitting a second alert to the operator device.

* * * * *